United States Patent
Yeh (10) Patent No.: US 6,212,733 B1
(45) Date of Patent: Apr. 10, 2001

(54) HUB AND WHEEL ASSEMBLY WITH AUTOMATIC MOVING DIRECTION ADJUSTMENT MECHANISM

(75) Inventor: Chuan-Ming Yeh, Chia-I (TW)

(73) Assignee: Link Treasure Limited (VG)

( * ) Notice: Subject to any disclaimer, the term of this patent is extended or adjusted under 35 U.S.C. 154(b) by 0 days.

(21) Appl. No.: 09/376,663

(22) Filed: Aug. 16, 1999

(51) Int. Cl.$^7$ .................................................. B60B 33/02
(52) U.S. Cl. .................................. 16/35 R; 16/38; 16/43
(58) Field of Search .......................... 16/35 R, 30, 35 D, 16/37, 38, 43, 44, 42 T, 42 R; 280/47.38, 647, 651, 657, 658, 47.34, 11.27

(56) References Cited

U.S. PATENT DOCUMENTS

| | | | |
|---|---|---|---|
| 1,490,890 | * | 4/1924 | Derschug ................................. 16/43 |
| 3,128,495 | * | 4/1964 | Tooth ...................................... 16/43 |
| 4,246,677 | * | 1/1981 | Downing et al. ...................... 16/35 R |
| 4,280,246 | * | 7/1981 | Christensen .......................... 16/35 D |
| 4,788,741 | * | 12/1988 | Hilborn ................................ 16/35 R |
| 4,913,452 | * | 4/1990 | Zun ...................................... 16/35 R |
| 5,040,641 | * | 8/1991 | Philips et al. ........................ 16/35 R |
| 5,103,530 | * | 4/1992 | Andrisin, III et al. ............... 16/35 R |
| 5,172,451 | * | 12/1992 | Chiu ..................................... 16/35 R |
| 5,594,974 | * | 1/1997 | Wattron et al. .................... 280/11.27 |
| 5,727,285 | * | 3/1998 | Goman ..................................... 16/38 |

\* cited by examiner

*Primary Examiner*—Chuck Y. Mah
(74) *Attorney, Agent, or Firm*—W. Wayne Liauh (57) ABSTRACT

A hub and wheel assembly enabling the moving direction of wheels of a vehicle to be adjusted instantly as the exerted pushing force changes direction comprises a wheel mount having wheels mounted thereon, and a swivel base assembly mounted on stroller leg. Wheel mount may quickly assemble with and detach from swivel base assembly. A protrusion of wheel mount, inserted into swivel base assembly, includes a circumferential groove having a cavity provided therein such that a spring-biased locking member may releasably engage with cavity for setting movement of wheels in a linear direction. Further, as a deflecting force is applied on the stroller locking member disengages with cavity for allowing wheels to move to left or right. Once the force is released, locking member will instantly return to its normal position to engage with cavity.

14 Claims, 11 Drawing Sheets

HUB AND WHEEL ASSEMBLY WITH AUTOMATIC MOVING DIRECTION ADJUSTMENT MECHANISM

FIELD OF THE INVENTION

The present invention relates to a hub and wheel assembly, and more particularly to swivel-mounted wheel assemblies adapted for use on baby stroller or cart in which the moving direction of wheels can be adjusted instantly as the exerted pushing force changes direction.

BACKGROUND OF THE INVENTION

Typically, most light-load vehicles such as strollers or carts have one or more wheels mounted on a bracket which pivotably mounted to frame of vehicle. As such, wheels can rotate freely for changing moving direction. However, such swivel-mounted wheeled vehicles tend to move irregularly in an uneven surface or a non-linear direction. As a result, a user must exert additional force on vehicle to overcome the irregularity to keep it moving in a linear direction. Further, such vehicle is not able to move in a linear direction after a forward pushing force is released, i.e., it will wobble. Additionally, user may loosen the grasp of the vehicle due to collision with the other object. As a result, vehicle may wobble and even fall. This may hurt the vehicle passenger.

A solution to the above problems associated with swivel-mounted wheel assembly is to either set the moving of wheel in a predetermined direction or let wheel swivel such as those disclosed in U.S. Pat. Nos. 5,103,530, 5,234,226, and 5,581,843. These patents generally disclose a hub and wheel arrangement having a cap pivotally secured to a swivel base assembly in an engagement configuration or cap disengaged with swivel base assembly for permitting wheels to move in a fixed direction or to rotate freely. However, such engagement or disengagement is done by manually manipulating cap. This manipulation is inconvenient.

SUMMARY OF THE INVENTION

It is thus an object of the present invention to provide a hub and wheel assembly with automatic moving direction adjustment mechanism in which the moving direction of wheels of a vehicle can be adjusted instantly as the exerted pushing force changes direction.

The advantages of the present invention are realized by providing a wheel mount having wheels mounted thereon, and a swivel base assembly mounted on stroller leg in which wheel mount is able to quickly assemble with and detach from swivel base assembly. A protrusion of wheel mount, inserted into swivel base assembly, includes a circumferential groove having a cavity provided therein such that a spring-biased locking member may releasably engage with cavity for setting movement of wheels in a predetermined linear direction. Further, as a left or right force is applied on the stroller the locking member disengages with cavity for allowing wheels to move to left or right. Once the force is released or a forward force is applied subsequently, the locking member will instantly return to its normal position to engage with cavity again.

The above and other objects, features and advantages of the present invention will become apparent from the following detailed description taken with the accompanying drawings.

DETAILED DESCRIPTION OF THE PREFERRED EMBODIMENTS

The First Embodiment

Figure 1:
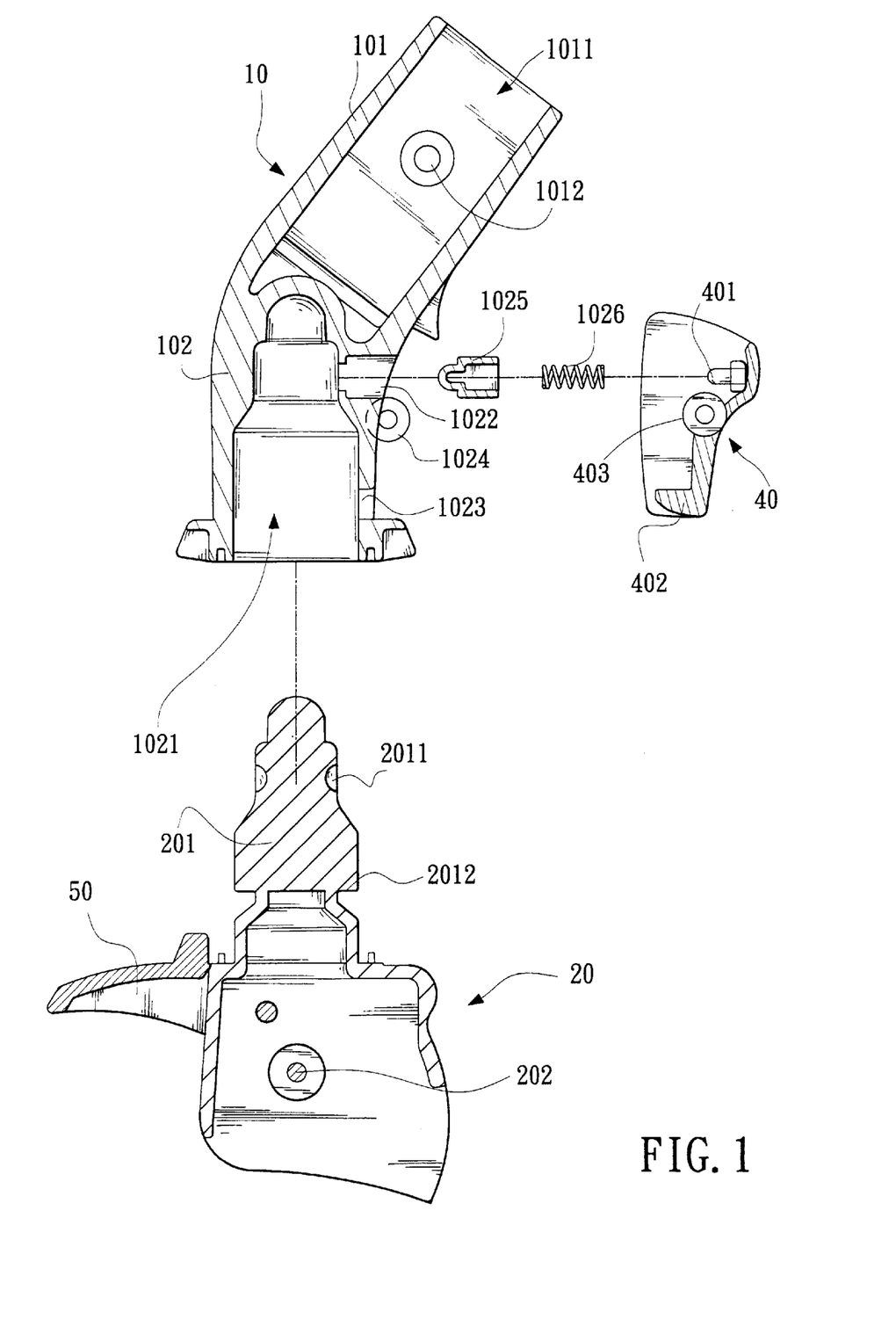
FIG. 1 is an exploded sectional view of a first embodiment of the present invention showing swivel base assembly, wheel mount, and lever.
Figure 2:
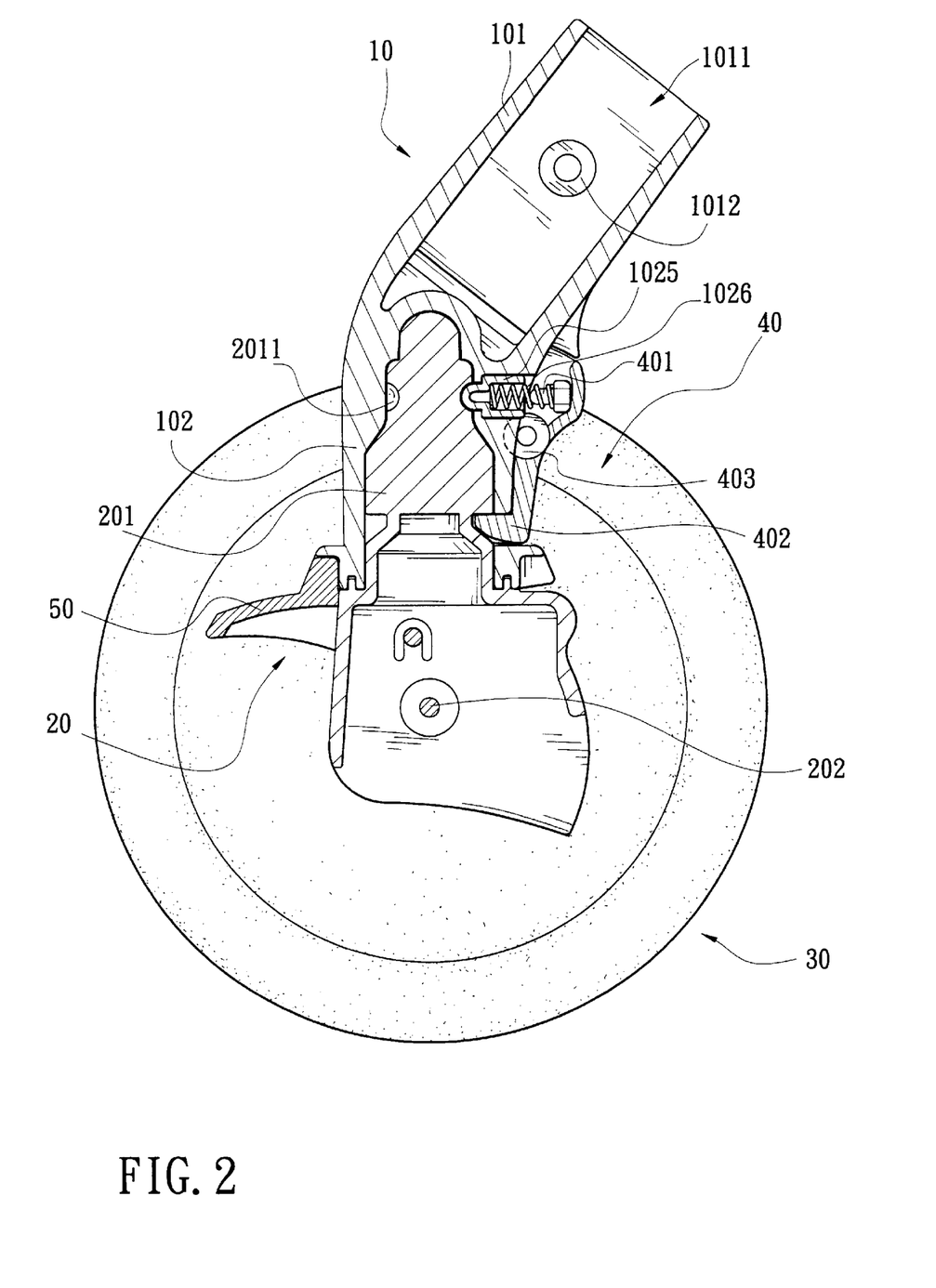
FIG. 2 is a sectional view of FIG. 1 with wheels assembled thereon.

Referring to FIGS. 1–2, a hub and wheel assembly of the first embodiment of the present invention comprises a swivel base assembly 10, a wheel mount 20 and wheels 30. Swivel base assembly 10 has a leg housing 101 and a base 102. Leg housing 101 has a first receiving space 1011 with opening upward and an aperture 1012. As such, aperture 1012 receiving a screw or a suitable alternative (not shown) may threadedly secure leg housing 101 to a stroller leg (not shown). Base 102 has a second receiving space 1021 with opening downward, an upper aperture 1022 and a lower aperture 1023 both penetrated through base 102 to reach second receiving space 1021, and a pivot point 1024. A locking member 1025 generally of cylindrical shape is movable within upper aperture 1022 and protruded into second receiving space 1021 with its round head portion.

A lever 40 comprises an upper protrusion 401, a lower protrusion 402, and a lever pivot 403. Lever pivot 403 is mounted on pivot point 1024 of base 102 and thus lever 40 can be pivotally about pivot point 1024 in a predetermined range. Upper protrusion 401 and lower protrusion 402 of lever 40 may be received in upper aperture 1022 and lower protrusion 1023 respectively. A spring 1026 is received in locking member 1025 with one end urged against bottom of locking member 1025 and the other distal end put on upper protrusion 401. Locking member 1025 is pushed to partly insert into second receiving space 1021 and upper protrusion 401 is pushed away from base 102 both by the compression of spring 1026. Accordingly, lower protrusion 402 of lever 40 is penetrated through lower aperture 1023 to reach second receiving space 1021. To the contrary, lower protrusion 402 will clear second receiving space 1021 if a pushing force toward base 102 is applied on upper protrusion 401 of lever 40.

Wheel mount 20 comprises a protrusion 201 for inserting into and free turning within second receiving space 1021 of swivel base assembly 10, and an axle 202 for allowing wheels 30 rotatably mounted thereon. Alternatively, a shock absorber (not shown) is mounted between axle 202 and each wheel 30 for providing a smooth ride over irregular surface conditions. Protrusion 201 has an upper circumferential groove 2011 and a lower recessed portion 2012 disposed corresponding to upper aperture 1022 and lower aperture 1023 of swivel base assembly 10 respectively. Locking member 1025 of swivel base assembly 10 inserts into circumferential groove 2011 and lower protrusion 402 of lever 40 snaps into recessed portion 2012 of protrusion 201 respectively when protrusion 201 of wheel mount 20 is inserted into second receiving space 1021 of swivel base assembly 10. In other words, base assembly 10 is swivel-mounted on wheel mount 20 so as to enable wheels 30 to rotate freely relative to base assembly 10. As stated above, lower protrusion 402 will clear second receiving space 1021 of base assembly 10 if a pushing force toward base 102 is applied on upper protrusion 401 of lever 40. As such, wheel mount 20 will disengage with swivel base assembly 10 by manually pulling down wheel mount 20. In view of foregoing, it is seen that wheel mount 20 and swivel base assembly 10 can be assembled or detached in a quick manner.

Figure 3A:
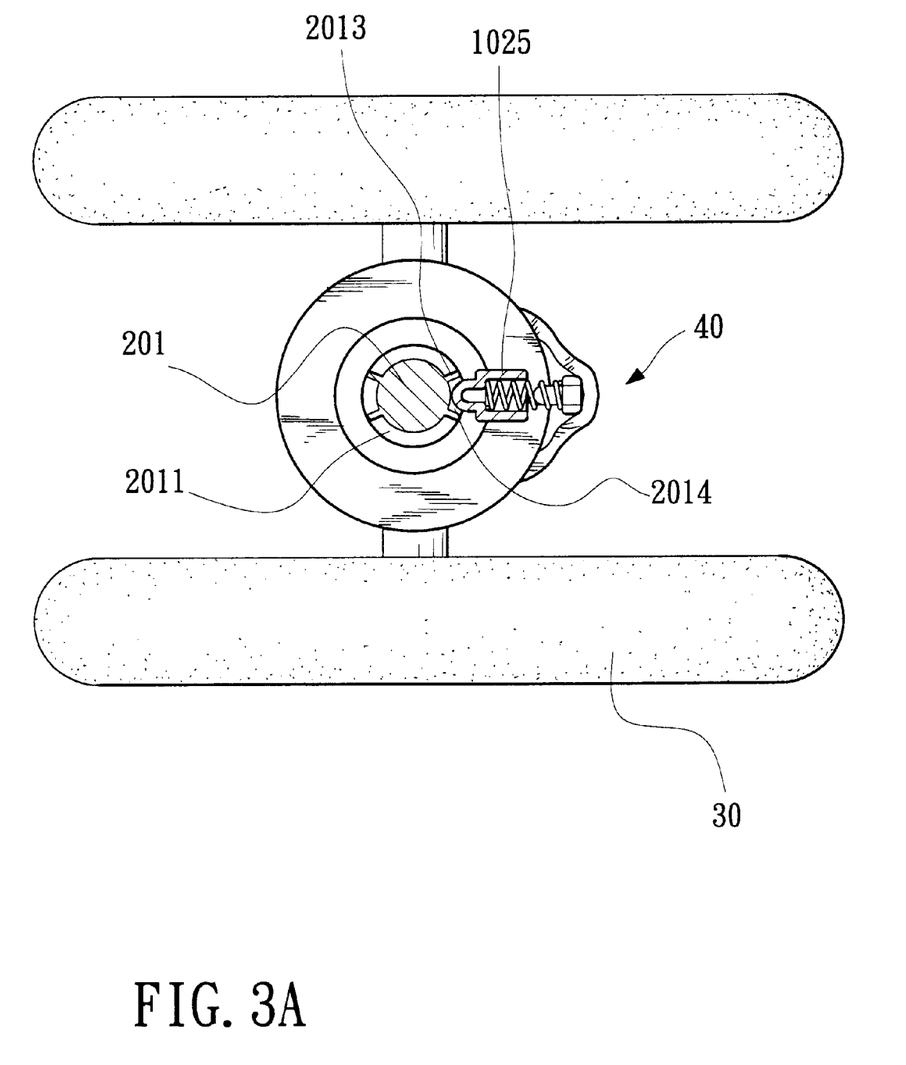
FIG. 3A is a top sectional view of FIG. 2 showing the engagement of locking member with cavity in a linear moving direction.
Figure 3B:
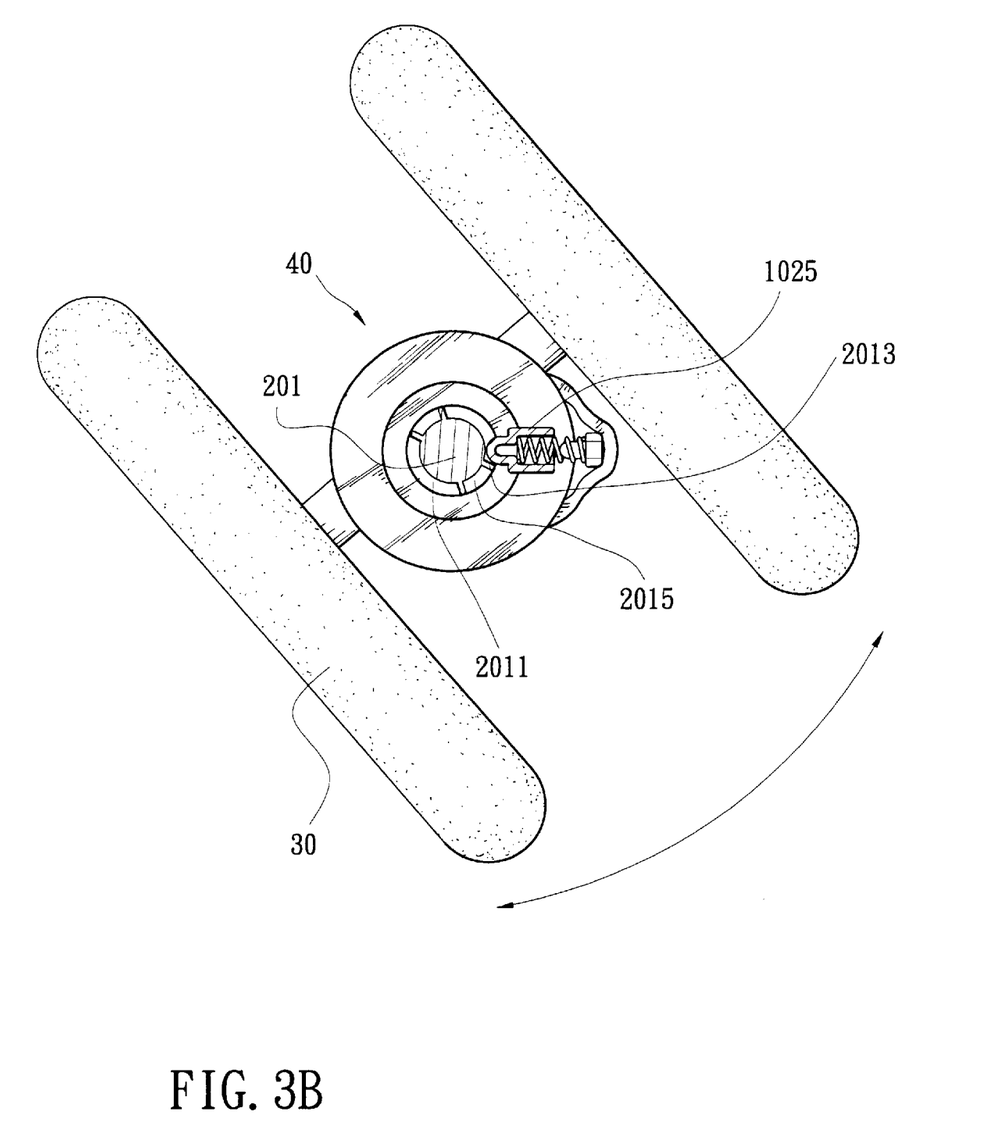
FIG. 3B is a top sectional view of FIG. 2 showing locking member disengaged with cavity when a deflecting force is applied on the stroller.

Referring to FIGS. 3A–3B, circumferential groove 2011 has two ridges 2013 and a cavity 2014 formed therebetween. Cavity 2014 is disposed parallel to the radial direction of wheels 30. In a linear moving condition of wheels 30, locking member 1025 is secured in cavity 2014 of circumferential groove 2011. As such, the moving direction of wheel mount 20 is fixed and accordingly the moving direction of wheels 30 is fixed (see FIG. 3A), i.e., cavity 2014 is aligned with the wheel mount 20 and wheels 30 in the moving direction.

As stated above, locking member 1025 is spring-biased and has a round head and thus a left or right force is applied on the stroller the force will impart to wheel mount 20 to bias locking member 1025 inward such that locking member 1025 disengages with cavity 2014 to move over ridge 2013 and abutted thereon for allowing wheel mount 20 as well as wheels 30 to move to left or right. Once the force is released or a forward force is applied subsequently, locking member 1025 will instantly return to its normal position to engage with cavity 1014. As such, wheels 30 move in a linear direction again. In order to more precisely control the engagement/disengagement of locking member 1025 with cavity 2014, preferably, circumferential groove 2011 has two pairs of two ridges 2013 and a cavity 2014 in which two cavities 2014 are separated by 180° each other.

Further, a wheel lock lever 50 is optionally provided in wheel mount 20 for permitting a user to manually restrict rotation of wheel mount 20 of the stroller in a locked condition. Alternatively, release wheel lock lever 50 to let wheel mount 20 freely rotate.

The Second Embodiment

Figure 4:
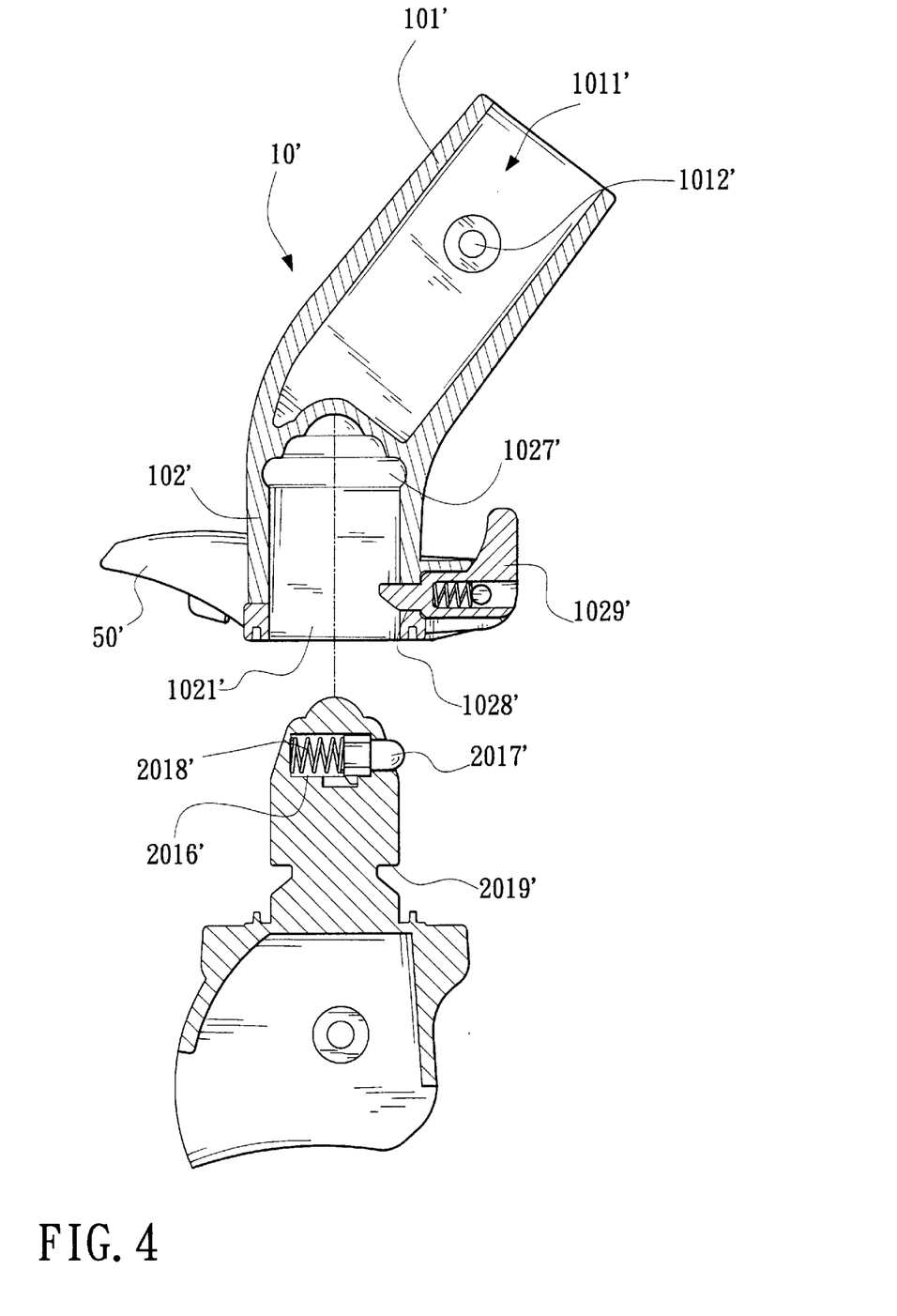
FIG. 4 is an exploded sectional view of a second embodiment of the present invention showing swivel base assembly and wheel mount.
Figure 5:
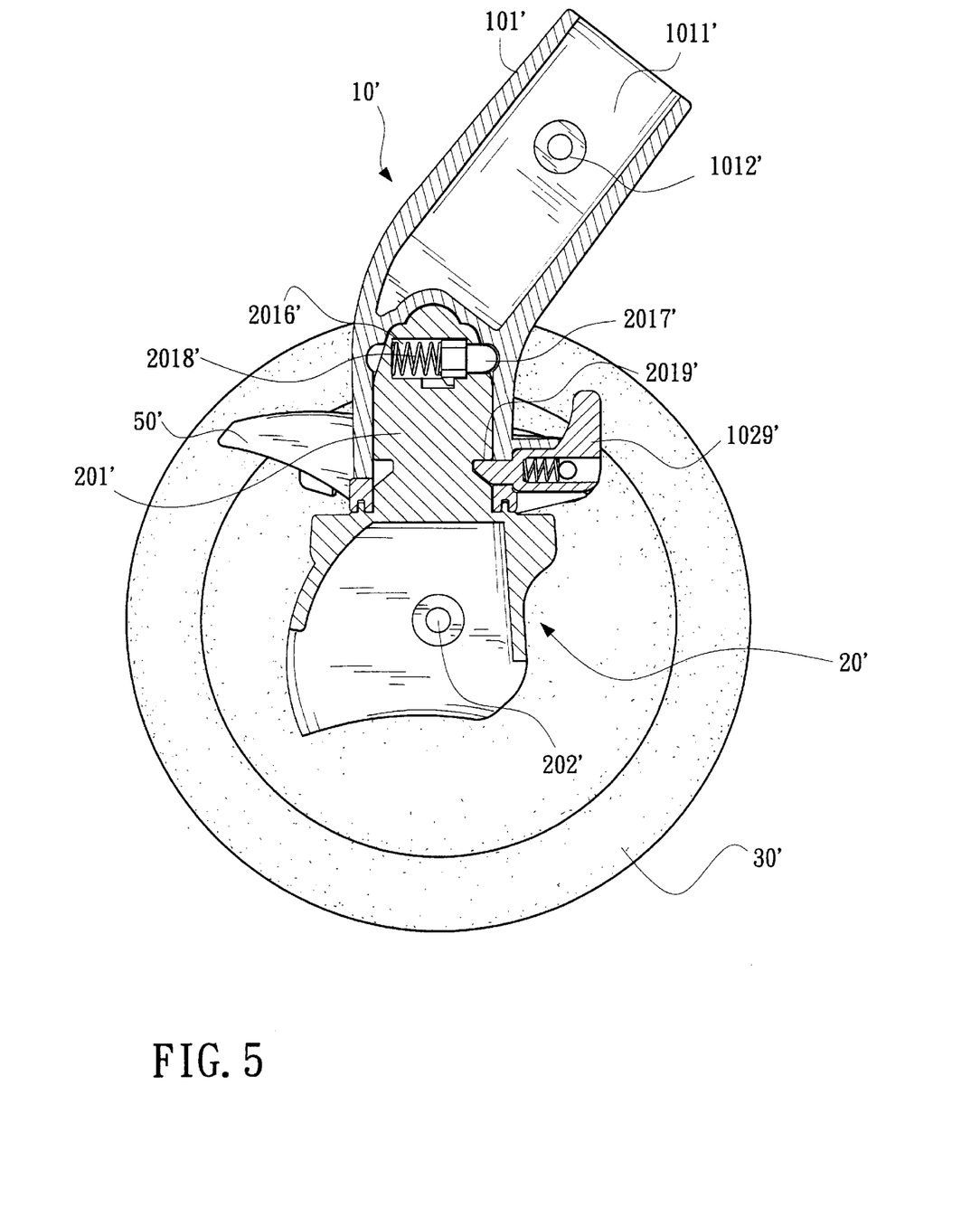
FIG. 5 is a sectional view of FIG. 4 with wheels assembled thereon.

Referring to FIGS. 4–5, a hub and wheel assembly of the second embodiment of the present invention comprises a swivel base assembly 10', a wheel mount 20' and wheels 30'. Swivel base assembly 10' has a leg housing 101' and a base 102'. Leg housing 101' has a first receiving space 1011' with opening upward and an aperture 1012'. As such, aperture 1012' receiving a screw or a suitable alternative (not shown) may threadedly secure leg housing 101' to a stroller leg (not shown). Base 102' has a second receiving space 1021' with opening downward. An upper circumferential groove 1027' is provided inside second receiving space 1021'. An aperture 1028' is provided to penetrate through base 102' to reach second receiving space 1021'. A head portion of a spring-biased locking member 1029' served as a quick coupling and detaching means for swivel base assembly 10' and wheel mount 20' is penetrated through aperture 1028' in a locked position.

Wheel mount 20' comprises a protrusion 201' for inserting into and free turning within second receiving space 1021' of swivel base assembly 10', and an axle 202' for allowing a wheel 30' rotatably mounted thereon. Protrusion 201' has an upper receiving space 2016' and a lower recessed portion 2019' disposed corresponding to locking member 1027' and aperture 1028' of swivel base assembly 10' respectively. A locking member 2017' and a spring 2018' are received within receiving space 2016' in which spring 2018' is biased between locking member 2017' and the bottom of receiving space 2016'. As such, locking member 2017' is movable in receiving space 2016' to cause its round head portion to insert into circumferential groove 1027' of swivel base assembly 10' when swivel base assembly 10' is mounted on wheel mount 20'.

As to the disengagement of wheel mount 20' and swivel base assembly 10', pull spring-biased locking member 1029' outwardly to clear recessed portion 2019' of wheel mount 20'. Thereafter, locking member 2017' clears circumferential groove 1027' if a pull down force is applied on wheel mount 20' so as to disengage wheel mount 20' with swivel base assembly 10'. In view of foregoing, it is seen that wheel mount 20' and swivel base assembly 10' can be assembled or detached in a quick manner by means of manipulating spring-biased locking member 1029'.

Figure 6A:
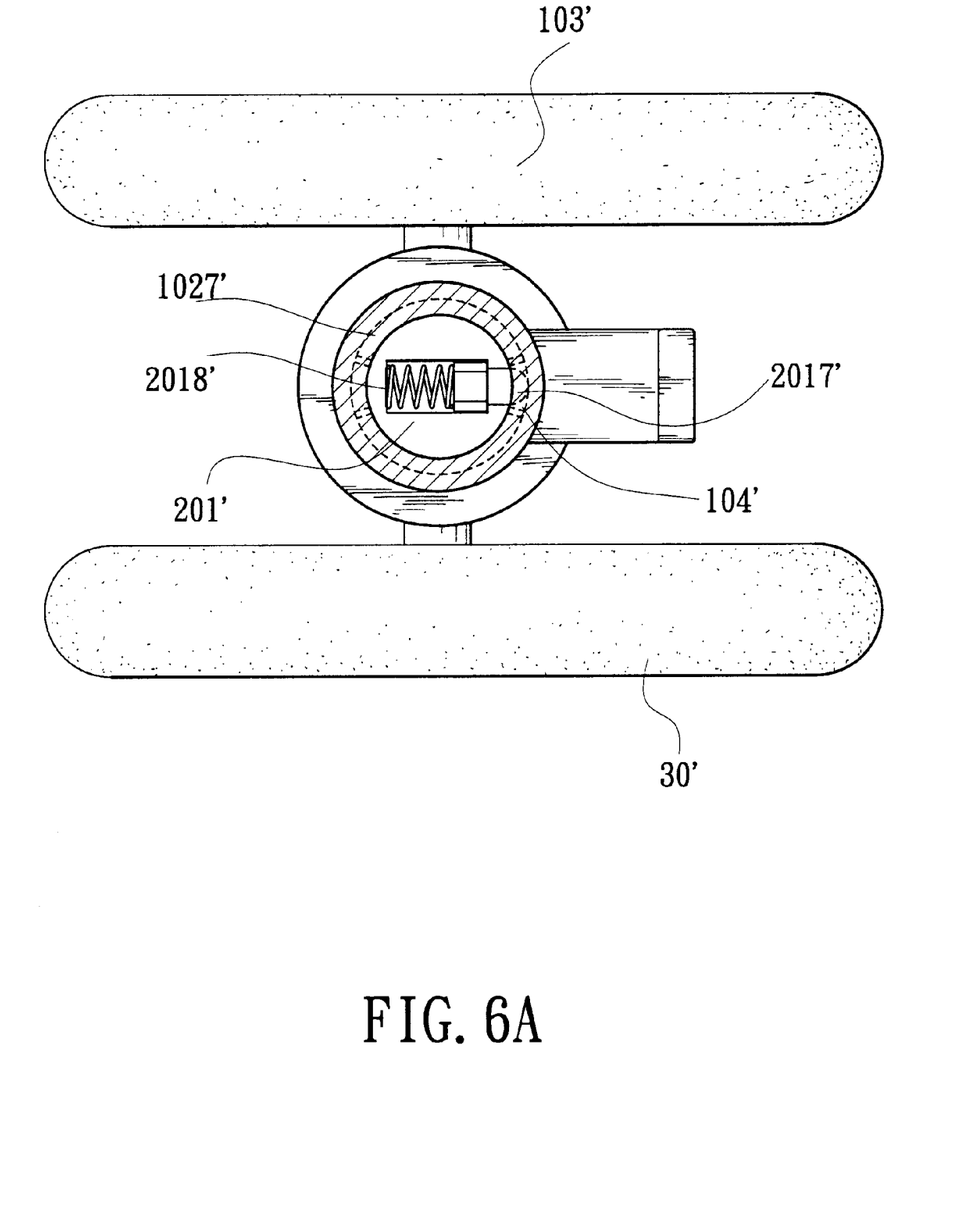
FIG. 6A is a top sectional view of FIG. 5 showing the engagement of locking member with cavity in a linear moving direction.
Figure 6B:
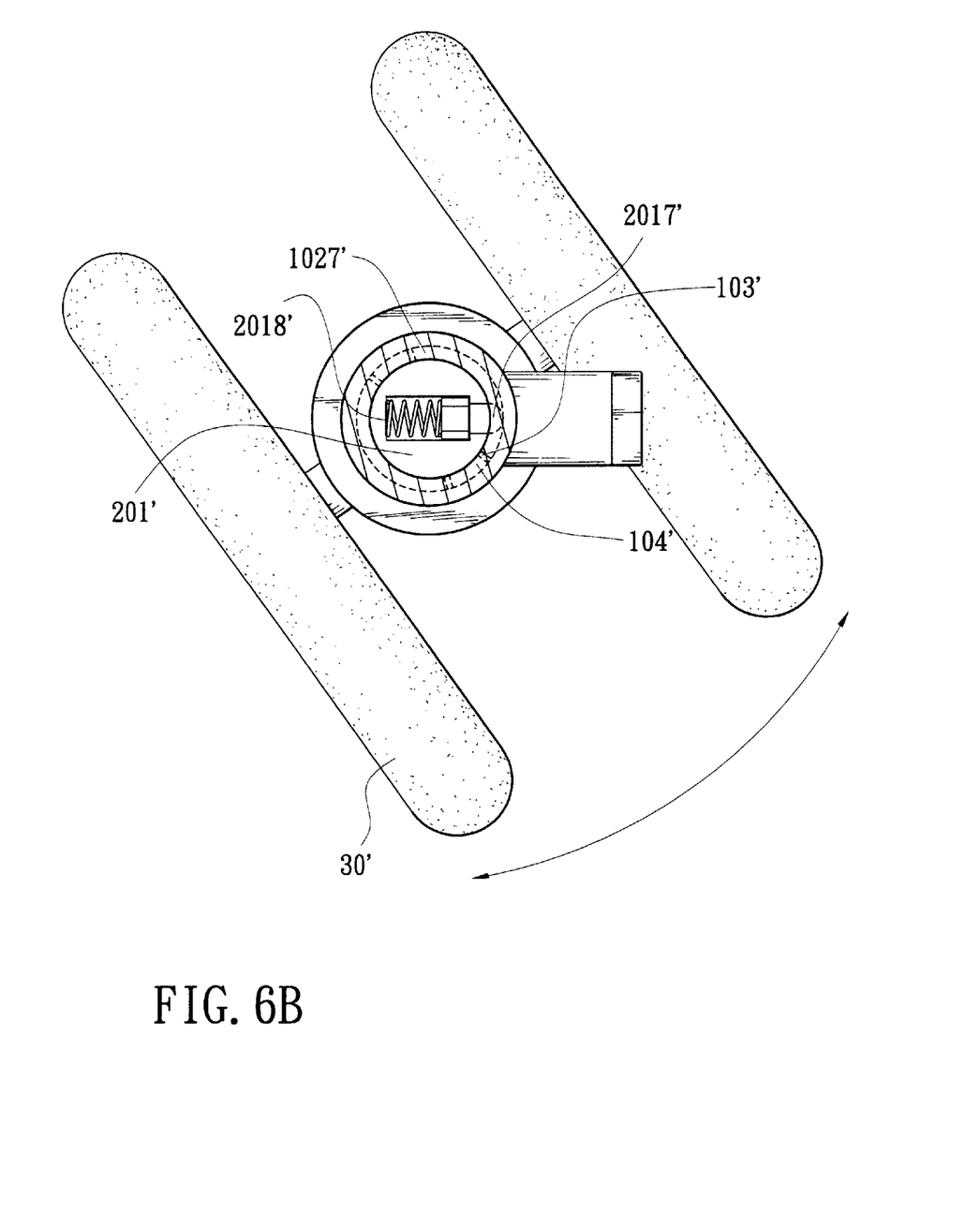
FIG. 6B is a top sectional view of FIG. 5 showing locking member disengaged with cavity when a deflecting force is applied on the stroller.

Referring to FIGS. 6A–6B, circumferential groove 1027' of swivel base assembly 10' has two ridges 103' and a cavity 104' formed therebetween. Cavity 104' is disposed parallel to the radial direction of wheels 30'. In a linear moving condition of wheels 30', locking member 2017' is secured in cavity 104' of circumferential groove 1027'. As such, the moving direction of wheel mount 20' is fixed and accordingly the moving direction of wheels 30' is fixed (see FIG. 6A), i.e., cavity 104' is aligned with the wheel mount 20' and wheels 30' in the moving direction.

As stated above, locking member 2017' is spring-biased and has a round head and thus a left or right force is applied on the stroller the force will impart to wheel mount 20' to bias locking member 2017' inward such that locking member 2017' disengages with cavity 104' to move over ridge 103' and abutted thereon for allowing wheel mount 20' as well as wheels 30' to move to left or right. Once the force is released or a forward force is applied subsequently, locking member 2017' will instantly return to its normal position to engage with cavity 104'. As such, wheels 30' move in a linear direction again. In order to more precisely control the engagement/disengagement of locking member 2017' with cavity 104', preferably, circumferential groove 1027' has two pairs of two ridges 103' and a cavity 104' in which two cavity 104' are separated by 180° each other.

Further, a wheel lock lever 50' is optionally provided in wheel mount 20' for permitting the user to manually restrict rotation of wheel mount 20' of the stroller in a locked condition. Alternatively, release wheel lock lever 50' to let wheel mount 20' freely rotate.

The Third Embodiment

The turning of wheels in the first and second embodiments are controlled by a radial coupling mechanism of locking member and cavity, while the turning of wheels in the third embodiment is controlled by an axial coupling mechanism of locking member and cavity.

Figure 7:
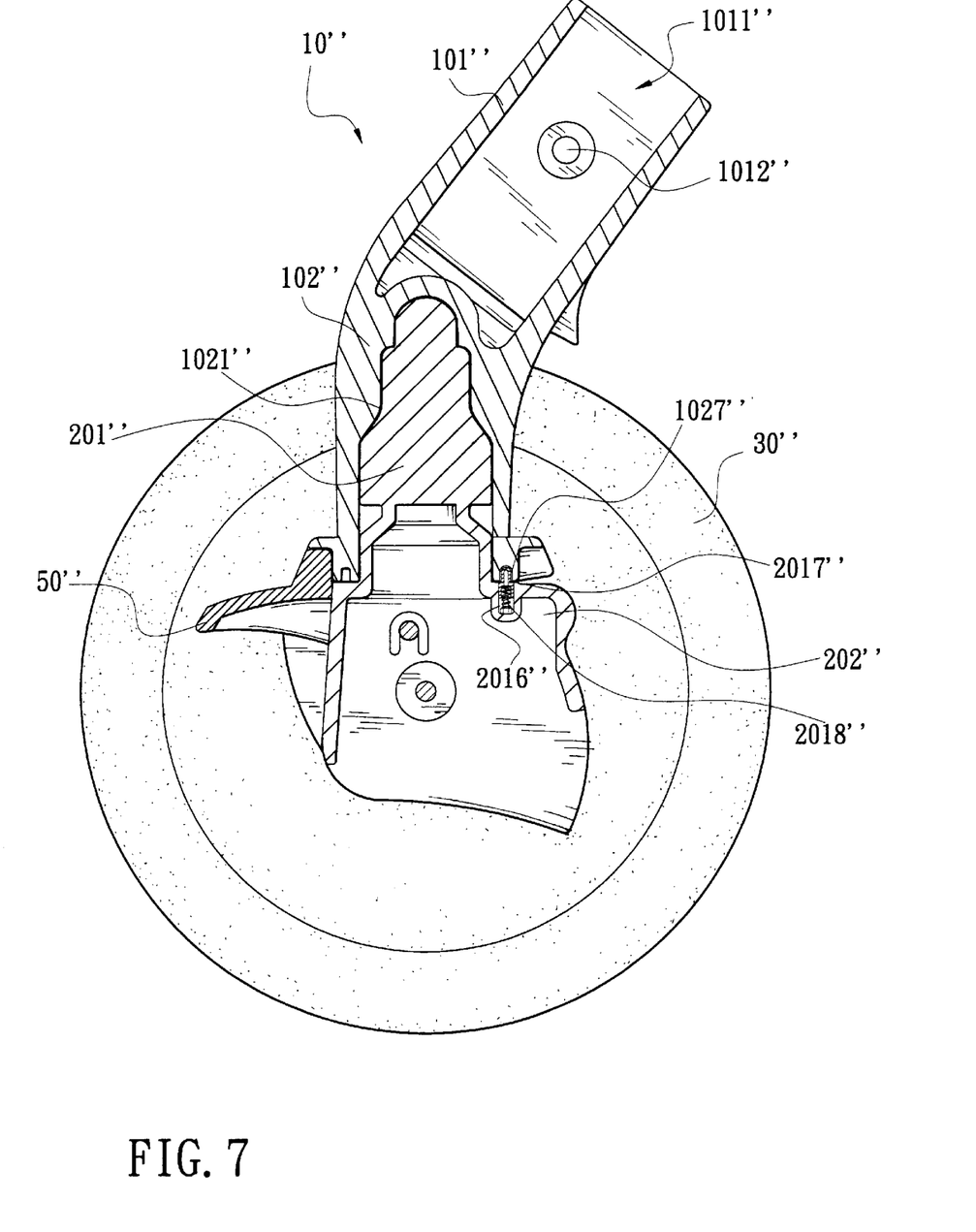
FIG. 7 is a sectional view of a third embodiment of the present invention.

Referring to FIG. 7, a hub and wheel assembly of the third embodiment of the present invention comprises a swivel base assembly 10", a wheel mount 20" and wheels 30". Swivel base assembly 10" has a leg housing 101" and a base 102". Leg housing 101" has a first receiving space 1011" with opening upward and an aperture 1012". As such, aperture 1012" receiving a screw or a suitable alternative (not shown) may threadedly secure leg housing 101" to a stroller leg (not shown). Base 102" has a second receiving space 1021" with opening downward. A circumferential groove 1027" is provided around the bottom of base 102".

Wheel mount 20" comprises a protrusion 201" for inserting into and free turning within second receiving space 1021" of swivel base assembly 10", and an axle 202" for allowing a wheel 30" rotatably mounted thereon. Wheel mount 20" has a receiving space 2016" disposed corresponding to groove 1027" of swivel base assembly 10". A locking member 2017" and a spring 2018" are received within receiving space 2016" in which spring 2018" is biased between locking member 2017" and the bottom of receiving space 2016". As such, locking member 2017" is movable in receiving space 2016" to cause its round head portion to insert into circumferential groove 1027" of swivel base assembly 10" when swivel base assembly 10" is mounted on wheel mount 20".

Figure 8:
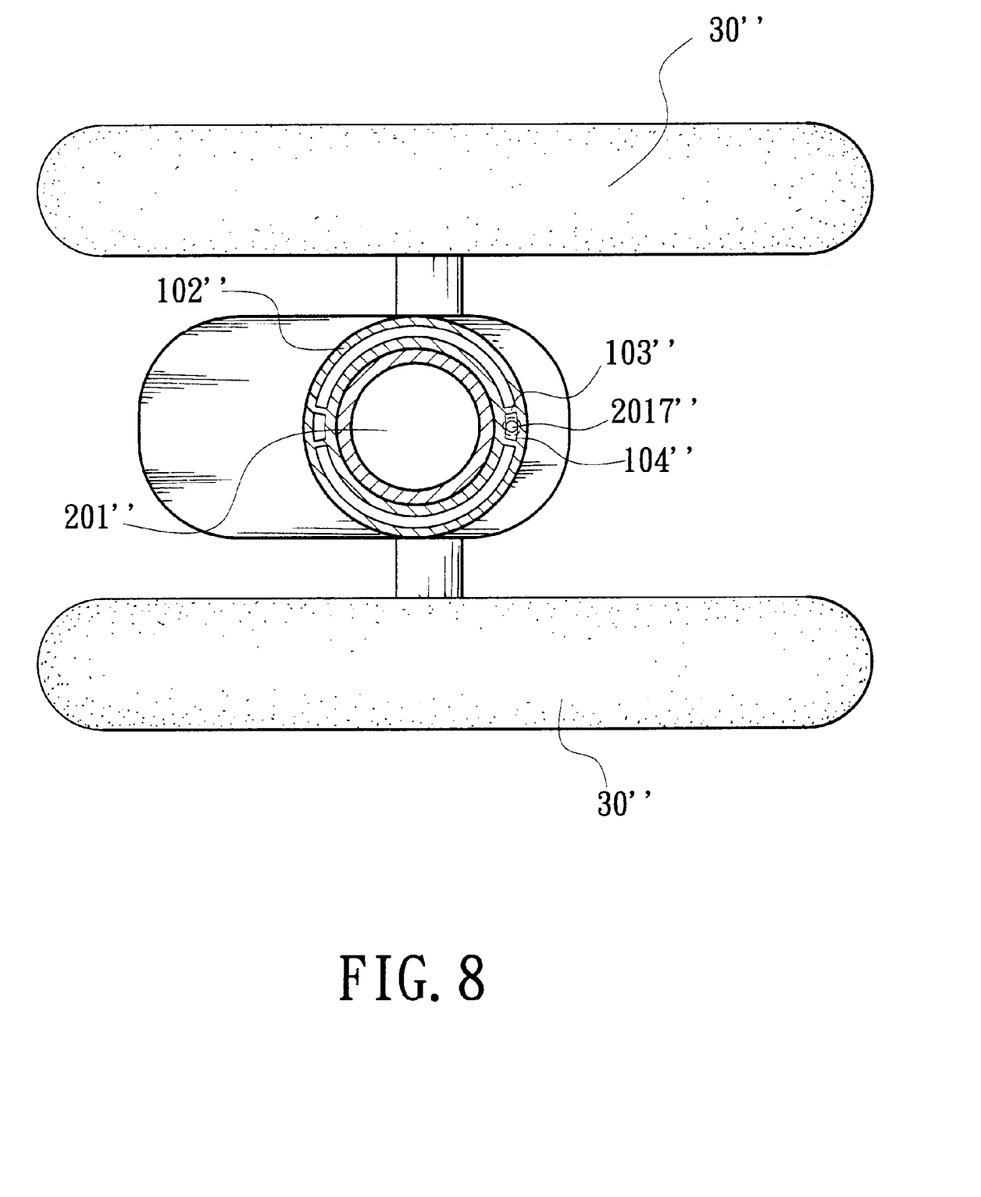
FIG. 8 is a top sectional view of FIG. 7 showing the engagement of locking member with cavity in linear moving direction.

Referring to FIG. 8, circumferential groove 1027" of swivel base assembly 10" has two ridges 103" and a cavity 104" formed therebetween. Cavity 104" is disposed parallel to the radial direction of wheels 30". In a linear moving condition of wheels 30", locking member 1025" is secured in cavity 104" of circumferential groove 1027". As such, the moving direction of wheel mount 20" is fixed and accordingly the moving direction of wheels 30" is fixed, i.e., cavity 104" is aligned with the wheel mount 20" and wheels 30" in the moving direction.

As stated above, locking member 2017" is spring-biased and has a round head and thus a left or right force is applied on the stroller the force will impart to wheel mount 20" to bias locking member 2017" inward such that locking member 2017" disengages with cavity 104" to move over ridge 103" and abutted thereon for allowing wheel mount 20" as well as wheels 30" to move to left or right. Once the force is released or a forward force is applied subsequently, locking member 2017" will instantly return to its normal position to engage with cavity 104". As such, wheels 30" move in a linear direction again. In order to more precisely control the engagement/disengagement of locking member 2017" with cavity 104", preferably, circumferential groove 1027" has two pairs of two ridges 103" and a cavity 104" in which two cavity 104" are separated by 180° each other.

Further, a wheel lock lever 50" is optionally provided in wheel mount 20" for permitting the user to manually restrict rotation of wheel mount 20" of the stroller in a locked condition. Alternatively, release wheel lock lever 50" to let wheel mount 20" freely rotate.

Figure 9:
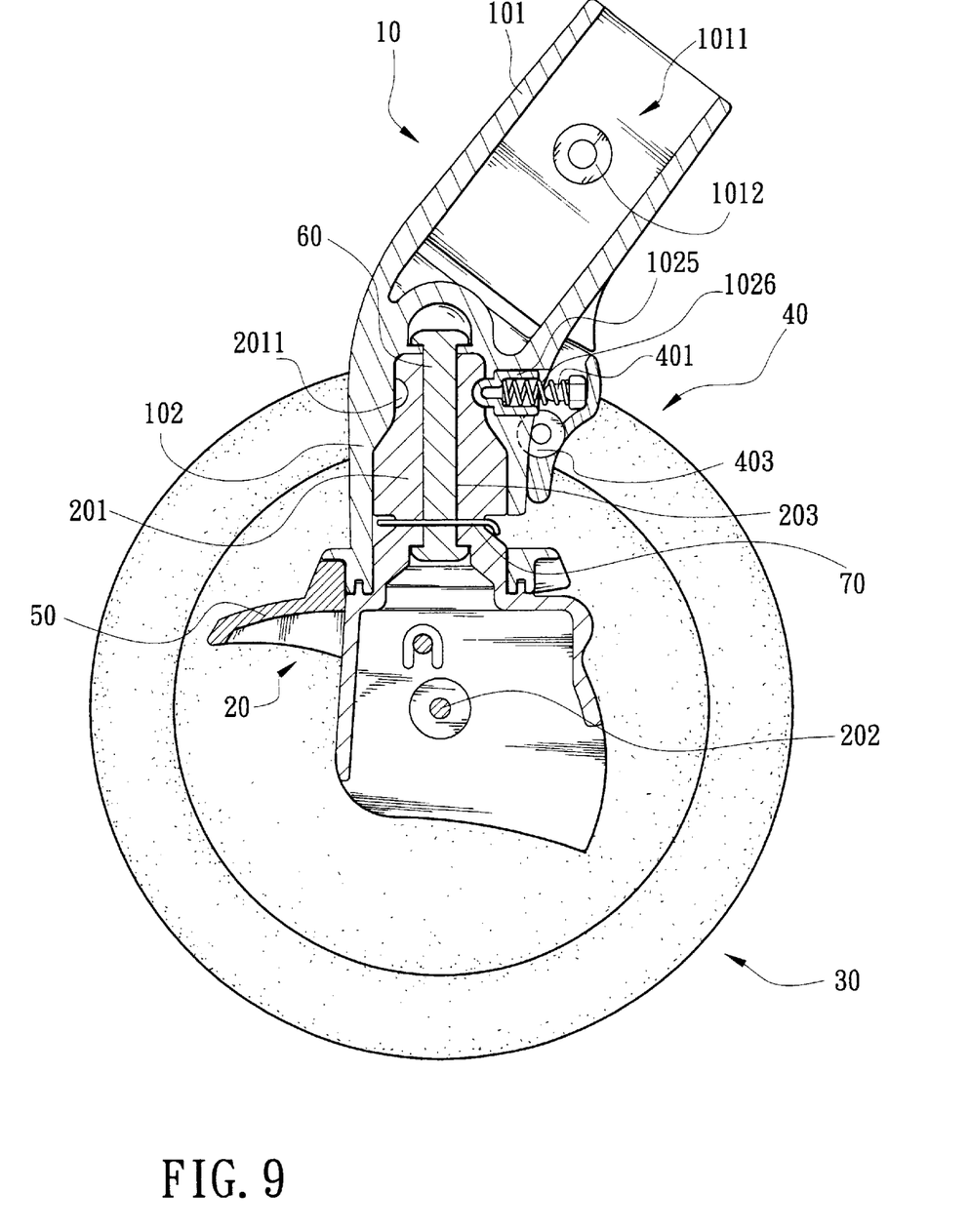
FIG. 9 is sectional view showing another configuration of engaging swivel base assembly with wheel mount.

Lower protrusion 402 of lever 40 of first embodiment and spring-biased locking member 1029' of second embodiment may be omitted by providing a receiving space 203 for receiving a connecting rod 60 therein which further firmly secured by a pin 70 penetrating through protrusion 201 and connecting rod 60 as shown in FIG. 9. Again, base assembly 10 is swivel-mounted on wheel mount 20 for allowing the wheel assembly to rotate freely.

While the invention herein disclosed has been described by means of specific embodiments, numerous modifications and variations could be made thereto by those skilled in the art without departing from the scope of the invention set forth in the claims.

What is claimed is:

1. A hub and wheel assembly with an automatic moving direction adjustment mechanism mounted on a movable vehicle comprising:

a swivel base assembly mounted to a frame member including a receiving space with opening downward, and a locking means movable within the receiving space;

a wheel mount including a protrusion releasably inserted into and free turning within the receiving space of the swivel base assembly, and an axle; and at least one wheel rotatably mounted on the axle;

wherein the protrusion has at least one cavity provided therein such that the locking means may releasably engage with the cavity for setting a movement of the wheel in a predetermined linear direction; and the hub and wheel assembly further comprises a circumferential groove on the protrusion of the wheel mount to allow the locking means to bypass and be disengaged with the cavity.

2. The hub and wheel assembly of claim 1, wherein the swivel base assembly has a first aperture, a second aperture, each of the apertures penetrated through the swivel base assembly to reach the receiving space, a pivot point, and a lever including a first protrusion, a second protrusion, and a lever pivot so as to pivotally be mounted on the pivot point, whereby the first protrusion of the lever is structured to be received in the first aperture, while the second protrusion of the lever is structured to penetrate the second aperture to reach the receiving space.

3. The hub and wheel assembly of claim 2, further comprising a spring disposed in the locking means with one end urged against a bottom of the locking means and the other end put on the first protrusion.

4. The hub and wheel assembly of claim 2, wheren the wheel mount comprises a recessed portion engaged with the second protrusion of the lever for firmly securing the wheel mount to the swivel base assembly.

5. The hub and wheel assembly of claim 1, wherein the cavity is aligned with the wheel in the predetermined linear direction when the locking means is engaged with the cavity.

6. The hub and wheel assembly of claim 1, further comprising a wheel lock lever for controlling a rotation of the wheels.

7. A hub and wheel assembly with an automatic moving direction adjustment mechanism mounted on a movable vehicle comprising:

a swivel base assembly mounted to a frame member including a receiving space with opening downward, and at least one cavity;

a wheel mount including a protrusion releasably inserted into and free turning within the receiving space of the swivel base assembly, and an axle; and at least one wheel rotatably mounted on the axle;

wherein the wheel mount has a spring-biased locking means and a second receiving space for receiving the spring-biased locking means therein such that the spring-biased locking means releasably engage with the cavity for setting a movement of the wheel in a predetermined linear direction; and the hub and wheel assembly further comprises a circumferential groove on an inside of the first receiving space to allow the spring-biased locking means to bypass and be disengaged with the cavity.

8. The hub and wheel assembly of claim 7, wherein the second receiving space is situated in the protrusion.

9. The hub and wheel assembly of claim 7, further comprising a coupling means on the swivel base assembly for attaching to the wheel mount.

10. The hub and wheel assembly of claim 7, wherein the protrusion of the wheel mount comprises a recessed portion.

11. The hub and wheel assembly of claim 7, wherein the cavity is aligned with the wheel in the predetermined linear direction when the locking means is engaged with the cavity.

12. The hub and wheel assembly of claim 7, further comprising a wheel lock lever for controlling a rotation of the wheels.

13. The hub and wheel assembly of claim 7, wherein the cavities are provided adjacent to the opening of the first receiving space.

14. A hub and wheel assembly with an automatic moving direction adjustment mechanism mounted on a movable vehicle comprising:

a swivel base assembly mounted to a frame member including a receiving space with opening downward, and at least one cavity;

a wheel mount including a protrusion releasably inserted into and free turning within the receiving space of the swivel base assembly, and an axle; and at least one wheel rotatably mounted on the axle;

wherein the wheel mount has a spring-biased locking means and a second receiving space for receiving the spring-biased locking means therein such that the spring-biased locking means releasably engage with the cavity for setting a movement of the wheel in a predetermined linear direction; and the hub and wheel assembly further comprises a circumferential groove around the opening of the first receiving space with opening downward to allow the spring-biased locking means to bypass and be disengaged with the cavity.

* * * * *